United States Patent [19]
Eriksson

[11] Patent Number: 6,094,929
[45] Date of Patent: Aug. 1, 2000

[54] ARRANGEMENT AND METHOD FOR THE REMOTE COOLING OF RADIO TRANSCEIVERS

[75] Inventor: Mats Eriksson, Spånga, Sweden

[73] Assignee: Telefonaktiebolaget LM Ericsson, Stockholm, Sweden

[21] Appl. No.: 09/216,899

[22] Filed: Dec. 21, 1998

[30] Foreign Application Priority Data

Dec. 22, 1997 [SE] Sweden ................................. 9704831

[51] Int. Cl.⁷ ................................................. F25D 23/12
[52] U.S. Cl. ........................................... 62/259.2; 62/361
[58] Field of Search ................... 62/259.2, 361

[56] References Cited

U.S. PATENT DOCUMENTS

| | | | |
|---|---|---|---|
| 5,271,239 | 12/1993 | Rockerfeller et al. | 62/259.2 |
| 5,343,358 | 8/1994 | Hilbrink | 361/700 |
| 5,471,850 | 12/1995 | Cowans | 62/223 |
| 5,474,120 | 12/1995 | Severson et al. | 165/39 |
| 5,709,100 | 1/1998 | Bear et al. | 62/259.2 |
| 5,740,018 | 4/1998 | Rumbut, Jr. | 361/720 |
| 5,913,888 | 6/1999 | Steinmeyer et al. | 62/51.1 |
| 5,940,270 | 8/1999 | Puckett | 361/699 |
| 5,950,712 | 9/1999 | Gates et al. | 165/45 |

FOREIGN PATENT DOCUMENTS

| | | |
|---|---|---|
| 5-116693 | 5/1993 | Japan . |
| 5-116694 | 5/1993 | Japan . |
| 6-164426 | 6/1994 | Japan . |

OTHER PUBLICATIONS

Hardell, L–J.; International–Type Search Report, Oct. 13, 1998, pp. 1–3, Search Request No. SE 97/01593.

Primary Examiner—Henry Bennett
Assistant Examiner—Mark Shulman
Attorney, Agent, or Firm—Jenkens & Gilchrist

[57] ABSTRACT

The present invention relates to an arrangement and to a method for cooling a radio transceiver unit (100a, 100b) mounted at the upper part of a radio mast (140; 120b). A cooling unit (110) conveys a coolant (130) from the lower part of the radio mast (140; 120b) to the radio transceiver unit (100), where said coolant (130) cools the transceiver unit. The proposed solution enables the cooling unit (110) to cool simultaneously two or more radio transceiver units (10a; 100b) that are distanced from the cooling unit (110). The solution also enables a reduction in the weight load on the radio mast (140; 120b) and enables the cooling unit (110) to be reached more easily for repair and maintenance work.

19 Claims, 3 Drawing Sheets

ARRANGEMENT AND METHOD FOR THE REMOTE COOLING OF RADIO TRANSCEIVERS

FIELD OF INVENTION

The present invention relates to an arrangement of devices for cooling heat generating apparatus, such as a radio transceiver unit, for instance.

The invention also relates to a method which is carried out with the aid of said arrangement.

BACKGROUND ART

Heat generating apparatus are normally cooled by a forced air flow driven by fan means. It is therefore necessary to position these heat generating apparatus so that they can be reached effectively by the flow of air from the fan means.

Radio transceiver units are positioned primarily to satisfy radio coverage requirements to the best possible effect. This often means that the radio transceiver unit must be mounted on a mast, on a roof, at the top of a wall structure or in some other place that is not easily reached. In those cases when heat radiation, caused by power dissipation in the transmitter, is high, a higher cooling effect is also required. A bulky and/or heavy fan means is required to produce a cooling effect of this required magnitude. When radio transmitter equipment is placed in a radio mast or some like structure, it must be assumed that the equipment is highly reliable, since it will be difficult to reach for repair and maintenance work, due to its high location. Naturally, it is also necessary to reinforce the mechanical strength of the mast to an extent commensurate with the increase in capacity of the cooling unit. When the radio transceiver unit is mounted in, on or above a building structure, it must be ensured that the bearing capacity of the structure and the space afforded will be sufficient to meet requirements.

From the aspect of radio coverage, it is thus desirable that the radio transmitter has a high permitted power output, which will probably result in high dissipation powers and significant heat radiation from the transceiver unit. At the same time, it is also desirable to use a reliable radio transceiver unit of low weight and small volume, for economic and aesthetic reasons. These requirements would seem to be incompatible with respect to known technology.

SUMMARY OF THE INVENTION

It is therefore an object of the present invention to permit a heat generating apparatus whose volume and weight are relatively small to radiate a large amount of heat.

Another object is to provide ready access for repairing servicing the cooling unit.

The present invention provides a solution to the problem associated with high thermal radiation and low-weight/small volumes, by remote cooling of the heat generating apparatus. The invention is primarily intended to ensure that the temperature of the heat generating apparatus will not reach damaging high levels at apparatus load peaks or in unfavourable environmental conditions, for instance at high outdoor air temperatures. However, the heat generating apparatus is assumed to be cooled by self-convection in normal cases.

The proposed arrangement is intended to cool one or more radio transceiver units and includes a cooling unit, which is placed outside all transceiver units. The cooling unit is also positioned at a distance from the transceiver units that significantly exceeds the largest dimension of all the radio transceiver units cooled by the cooling unit. Also included is a conduit for conveying coolant from the cooling unit to each of the radio transceiver units.

According to one embodiment, the proposed arrangement includes a radio mast which has a heat generating radio transceiver unit mounted on its upper part. A cooling unit is positioned adjacent the lower part of the mast. A coolant conveying conduit extends from the cooling unit to the radio transceiver unit, this coolant functioning to cool the radio transceiver unit.

The arrangement according to this embodiment of the invention is characterised by the features set forth in claim 2.

According to one preferred embodiment of the proposed arrangement, the coolant is air and the cooling unit includes a fan means.

According to alternative embodiments of the invention, the coolant is a liquid or a medium which alternately assumes the aggregate forms of gas and liquid respectively.

According to one embodiment of the inventive method, a coolant is accelerated upwards in a conduit along the radio mast, from a cooling unit located at the lower part of said mast. The coolant is then caused to pass a radio transceiver unit mounted in the upper part of the mast, therewith cooling said unit.

The invention enables high dissipation powers to be allowed in small radio transceiver units without risking overheating of said units. The invention thus enables powerful radio transceiver units to be installed at places and in spaces where high thermal radiation cannot be accepted and/or heavy and/or bulky equipment cannot be placed.

The invention also enables repair and maintenance work on the cooling equipment of a radio transceiver unit to be carried out more easily, since the cooling equipment can be positioned in a place that is accessed much more readily than the actual transceiver unit.

Further fields in which the present invention can be applied will be evident from the following detailed description. It will be understood, however, that the detailed description and specific exemplifying embodiments are only intended to illustrate the concept of the invention, since changes and modifications obvious to the skilled person on the basis of this detailed description can be made within the scope of the invention.

The invention will now be described in more detail with reference to preferred embodiments and also with reference to the accompanying drawings.

DESCRIPTION OF PREFERRED EMBODIMENTS

Figure 1:
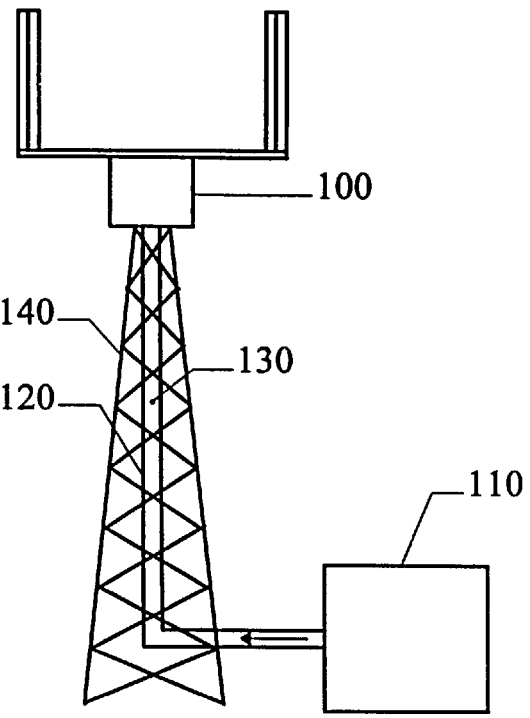
FIG. 1 illustrates a first embodiment of an inventive arrangement.

FIG. 1 illustrates an arrangement according to a first embodiment of the invention, in which the heat generating apparatus is a radio transceiver unit 100 mounted on the top of a radio mast 140, said mast having a lattice construction in the illustrated case. It will be understood, however, that the radio mast 140 may be of any suitable kind, such as a pole mast, a bridge column or some corresponding structure. A cooling unit 110 is positioned adjacent the lower part of the mast. A conduit 120, in the form of a heat-insulated hose or pipe, connects the cooling unit 110 with the radio transceiver unit 100. The conduit 120 conveniently extends along the mast 140 and functions to convey coolant 130 from the cooling unit 110 to the transceiver unit 100. The coolant 130 may be a gaseous coolant or a liquid coolant, or may alternate between a gaseous and liquid state and is caused to pass the transceiver unit 100 so as to absorb thermal energy emitted therefrom. The coolant 130 conveyed from the cooling unit 110 thus cools the radio transceiver unit 100.

Figure 2:
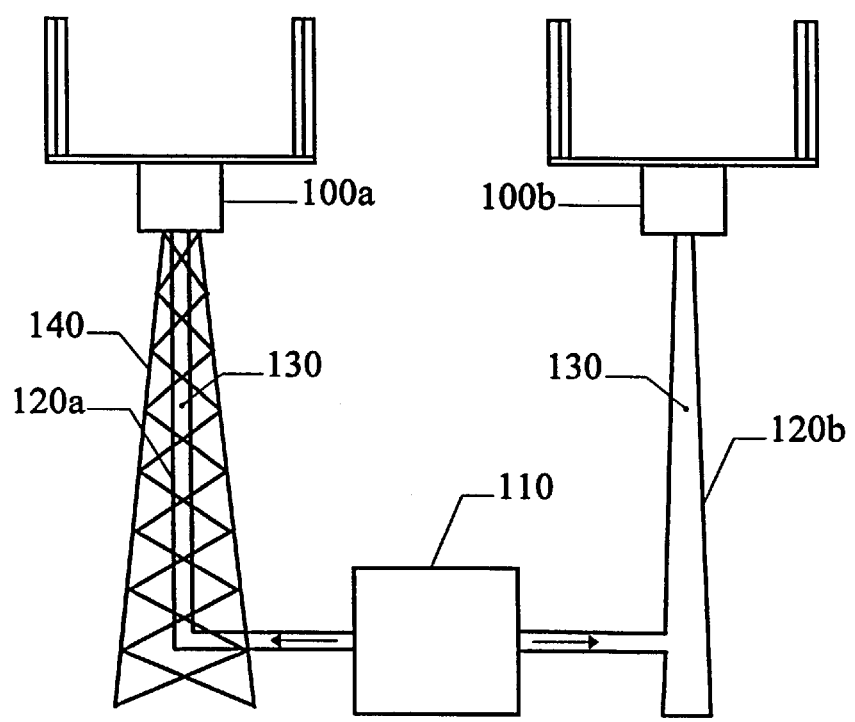
FIG. 2 illustrates a second embodiment of an inventive arrangement.

FIG. 2 illustrates a second embodiment of the inventive arrangement. In this embodiment, coolant 130 delivered from a cooling unit 110 cools two radio transceiver units 100a and 100b simultaneously. A first radio transceiver unit 100a is mounted on top of a lattice mast 140, while a second radio transceiver unit 100b has been placed in the upper part of a hollow pole mast 120b. Coolant 130 is conveyed from the cooling unit 110 to the first transceiver unit 100a through a conduit 120, while coolant 130 is conveyed to the second transceiver unit 100b at least through part of the extension of the hollow space in the interior of the pole mast 120b. The cooling unit 110 may, of course, be used to cool more than two radio transceiver units 100a; 100b in a corresponding manner. As with the earlier case, the coolant 130 may also consist of any gaseous or liquid medium that has the requisite heat capacitive properties.

Figure 3:
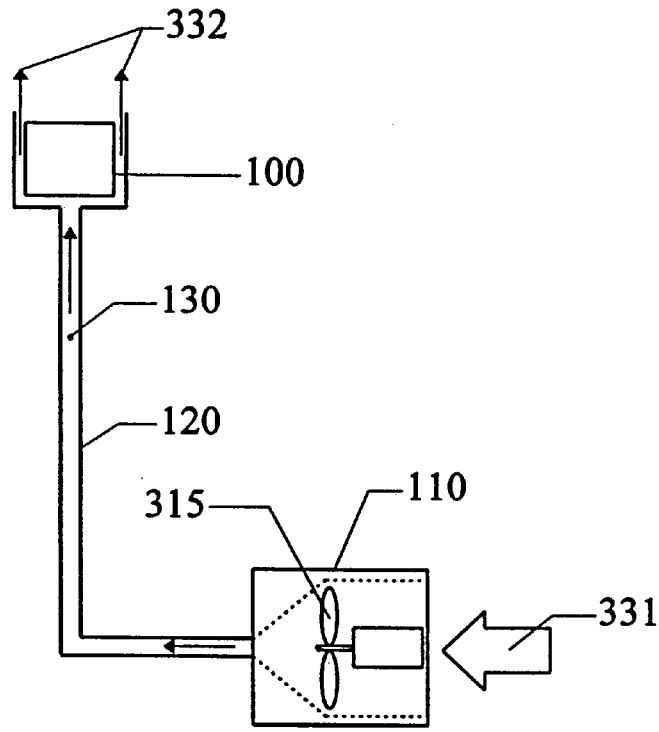
FIG. 3 illustrates a first example of the an inventive arrangement.

FIG. 3 illustrates a first working example of an inventive arrangement. In the illustrated case, a cooling unit 110 includes a fan means 315 which functions to force air to flow 331 into a conduit 120. The air 130 taken into the conduit is then forced upwards, so as to pass a radio transceiver unit 100. The air 130 will absorb thermal energy from the transceiver unit 100 during its passage past said unit and therewith cool the unit, provided that the temperature of the air 130 is lower than the surface temperature of the transceiver unit 100. After having passed the radio transceiver unit 100, the now heated air 332 flows out into the surrounding air masses.

Figure 4:
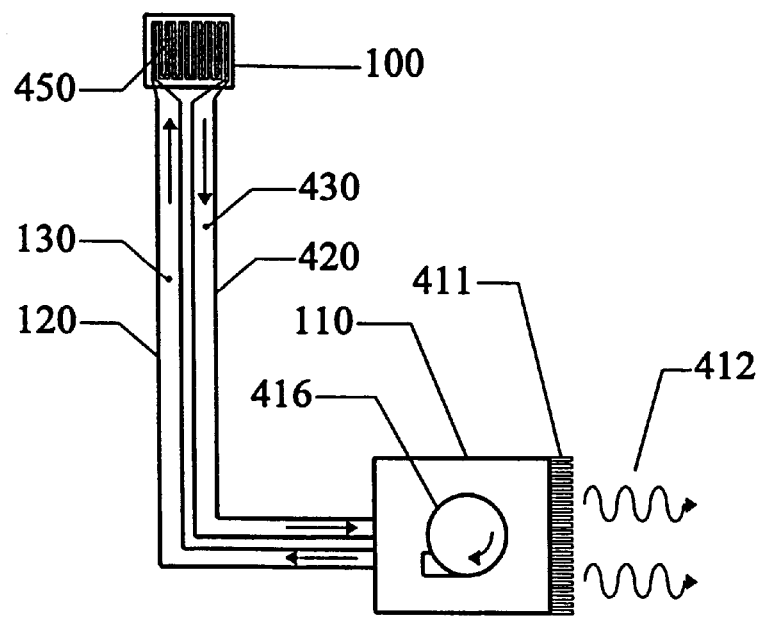
FIG. 4 illustrates a second example of the an inventive arrangement.

FIG. 4 illustrates a second working example of the inventive arrangement. In this example, the cooling unit 110 includes a pump means 416. The pump means 416 drives a liquid coolant 130, for instance oil, up along a first conduit 120 to a cooler 450. The cooler 450 is placed in the immediate proximity of a radio transceiver unit 100, preferably in abutment therewith. As the liquid coolant 130 passes through the cooler 450, it absorbs the thermal energy emitted from the radio transceiver unit 100, provided that the surface temperature of said unit is higher than the temperature of the coolant 130. The temperature of the coolant 430 passing the cooler 450 is raised as a result of this absorption, while cooling the radio transceiver unit 100 on the other hand. The heated coolant 430 is returned through a second conduit 420 down to the pump means 416 where it looses its surface heat 412 to the ambient air, through the medium of contact with cooling fins 411 for some like cooling arrangement. The pump means 416 thereafter again drives the cooled coolant 130 up through the first conduit 120.

In an alternative variant of the working example of the inventive arrangement illustrated in FIG. 4, the coolant 130 consists of a medium which takes a liquid aggregate state in the first conduit 120 and which is gaseous in the heated state in the second conduit 420. Ammonia or halogenated hydrocarbons are examples of suitable coolants in this case. In this variant, the cooling unit 110 includes a compressor unit 416 which drives the liquid coolant 130 through the first conduit 120 to an evaporator 450 in the immediate vicinity of the radio transceiver unit 100. The coolant 130 is heated in the evaporator 450 and converted to a gaseous state 430. Thermal energy from the radio transceiver unit 100 is absorbed by this process, therewith cooling said unit. The gaseous coolant 430 is returned to a condenser 411 in the cooling unit 110, where the medium 430 returns to a liquid state 130 and is again driven up through the first conduit 120 by means of the compressor unit 416.

The radio transceiver unit 100 and the cooling element 110 may be separated in a way different to that illustrated with reference to FIGS. 1 and 2, by means of a radio mast. Examples of such alternative placements of the inventive arrangement are illustrated in FIGS. 5–7.

Figure 5:
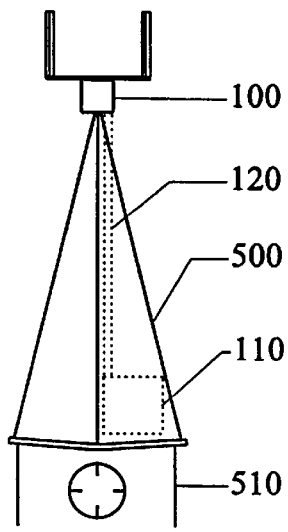
FIG. 5 illustrates a first alternative positioning of the an inventive arrangement.

In the FIG. 5 illustration, a radio transceiver unit is mounted on the roof 500 of a building 510, and is therefore not easily reached. The cooling element 110 is positioned in a less conspicuous and more readily accessed place inside or outside the building 510. The radio transceiver unit 100 and the cooling unit 110 are interconnected by at least one coolant conveying conduit 120.

Figure 6:
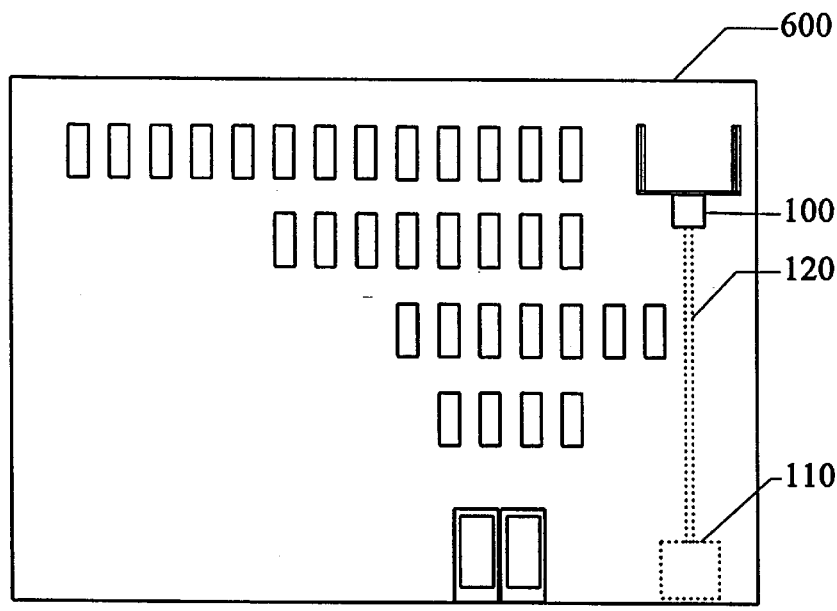
FIG. 6 illustrates a second alternative positioning of the an inventive arrangement.

In the FIG. 6 illustration, the radio transceiver unit 100 is, instead, mounted on a wall of a building 600, while the cooling unit 110 is positioned in some other place inside or adjacent the building 600. The radio transceiver unit 100 and the cooling unit 110 are interconnected by means of at least one coolant conveying conduit 120.

Figure 7:
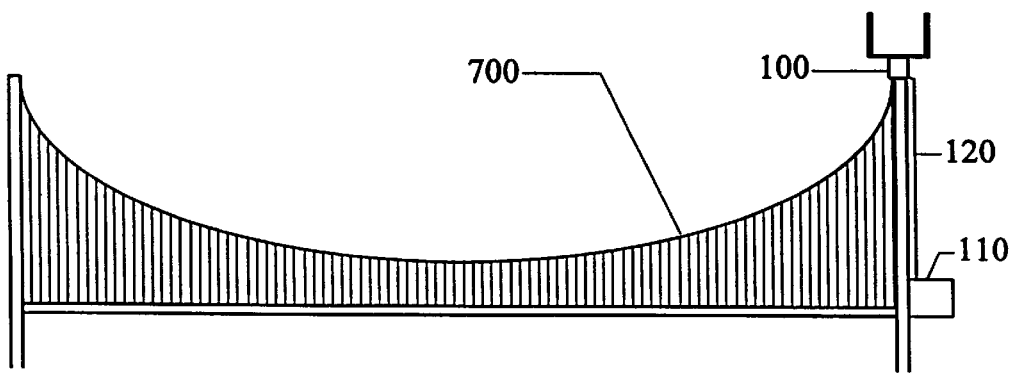
FIG. 7 illustrates a third alternative positioning of the an inventive arrangement.

In the FIG. 7 illustration, a radio transceiver unit 100 is mounted on a high point of a bridge 700. The cooling unit 110 on the other hand is positioned in a lower and less exposed place, this place also being more accessible to service personnel. The radio transceiver unit 100 and the cooling unit 110 are interconnected by at least one coolant conveying conduit 120.

It will be obvious from the above description of the invention that several variations and modifications are possible. Such variations, however, shall not be considered as deviations from the concept of the invention but as modifications that would be obvious to the skilled person and included in the scope of the following claims.

What is claimed is:

1. A system for cooling at least one radio transceiver unit, comprising:

a radio transceiver unit;

a cooling unit separate from the transceiver unit and located at a distance from the transceiver unit, said distance substantially exceeding a largest dimension of the transceiver unit; and a conduit for conveying a coolant from the cooling unit to the radio transceiver to cool the radio transceiver, wherein the coolant comprises air.

2. The system of claim 1, wherein the cooling unit comprises a fan means.

3. The system of claim 1, wherein the coolant comprises a liquid.

4. The system of claim 1, further comprising a second radio transceiver unit, wherein the conduit further conveys the coolant to the second radio transceiver to cool said second radio transceiver.

5. A system for cooling at least one radio transceiver unit, comprising:

a radio mast;

a radio transceiver unit mounted at an upper part of the radio mast;

a cooling unit positioned adjacent a lower part of the radio mast;

a coolant conveying conduit for conveying a coolant from the cooling unit to the radio transceiver to cool the radio transceiver, wherein the coolant comprises air.

6. The system of claim 5, wherein the cooling unit comprises a fan means.

7. The system of claim 5, wherein the coolant conveying conduit is defined by a hollow portion of the radio mast.

8. The system of claim 5, further comprising a coolant return conduit for conveying the coolant from the radio transceiver to the cooling unit after cooling the radio transceiver unit.

9. A method of cooling a radio transceiver unit, comprising the steps of:

accelerating coolant in a cooling unit positioned adjacent a lower part of a radio mast and conveying the coolant through a first conduit along the radio mast to a radio transceiver unit mounted in connection with an upper part of the radio mast, wherein the first conduit is formed totally or partially by defining surfaces of the radio mast; and cooling the radio transceiver unit by means of the coolant.

10. The method of claim 9, further comprising the step of returning the coolant through a second conduit from the radio transceiver unit to the cooling unit.

11. A system for cooling at least one radio transceiver unit, comprising:

a radio mast;

a radio transceiver unit mounted at an upper part of the radio mast;

a cooling unit positioned adjacent a lower part of the radio mast;

a coolant conveying conduit for conveying a coolant from the cooling unit to the radio transceiver to cool the radio transceiver, wherein the coolant conveying conduit is formed totally or partially by defining surfaces of the radio mast.

12. The system of claim 11, wherein the coolant comprises air.

13. The system of claim 12, wherein the cooling unit comprises a fan means.

14. The system of claim 11, wherein the coolant comprises a liquid.

15. The system of claim 14, wherein the cooling unit comprises a pump means.

16. The system of claim 11, wherein the coolant alternates between a liquid and gaseous state.

17. The system of claim 16, wherein the cooling unit comprises a compressor means.

18. The system of claim 11, further comprising a coolant return conduit for conveying the coolant from the radio transceiver to the cooling unit after cooling the radio transceiver unit.

19. The system of claim 11, further comprising a second radio transceiver unit, wherein the coolant conveying conduit further conveys the coolant to the second radio transceiver to cool said second radio transceiver.

* * * * *